(12) United States Patent
Hu

(10) Patent No.: US 7,391,821 B2
(45) Date of Patent: Jun. 24, 2008

(54) OPERATIONAL STATE TRANSITION AND EVENT LOGGING SYSTEM FOR AN RF TRANSMITTER

(75) Inventor: Zhiqun Hu, Liberty Township, OH (US)

(73) Assignee: Harris Corporation, Melbourne, FL (US)

( * ) Notice: Subject to any disclaimer, the term of this patent is extended or adjusted under 35 U.S.C. 154(b) by 153 days.

(21) Appl. No.: 11/075,148

(22) Filed: Mar. 8, 2005

(65) Prior Publication Data

US 2006/0203930 A1  Sep. 14, 2006

(51) Int. Cl.
*H04L 27/04* (2006.01)
(52) U.S. Cl. ...................................................... 375/295
(58) Field of Classification Search ................. 375/295; 714/25, 708; 710/19; 702/187; 715/808; 434/350, 322; 330/124 R, 51; 455/115.1, 455/115.4; 342/204
See application file for complete search history.

(56) References Cited

U.S. PATENT DOCUMENTS 4,274,156 A * 6/1981 Trefney .................. 455/115.4
5,240,419 A * 8/1993 deGyarfas .................... 434/322
5,513,185 A * 4/1996 Schmidt ....................... 714/708
5,920,282 A * 7/1999 Vik et al. ...................... 342/204
6,124,758 A * 9/2000 Korte et al. .............. 330/124 R
6,128,017 A * 10/2000 Alimpich et al. ............. 715/808
6,135,777 A * 10/2000 Vogel .......................... 434/350
6,188,277 B1 * 2/2001 Borodulin et al. ............. 330/51
6,415,403 B1 * 7/2002 Huang et al. ................. 714/726
6,591,375 B1 * 7/2003 Hu ............................... 714/25
6,760,687 B2 * 7/2004 Apel et al. ................... 702/187
6,954,620 B2 * 10/2005 Rotta et al. ............... 455/115.1
2004/0015619 A1 * 1/2004 Brown et al. .................. 710/19

* cited by examiner

*Primary Examiner*—Don N Vo
(74) *Attorney, Agent, or Firm*—Tarolli, Sundheim, Covell & Tummino LLP

(57) ABSTRACT

The operational state transitions and events of an RF transmitter having a plurality of operational states are monitored and recorded. A plurality of ports are provided that each receive an indication of an occurrence of an event that can cause a transition from one state to another of the plurality of states. A transition status memory stores transition status data representing the status of each associated state. A microcontroller is programmed so that it determines, for each state, from the indications whether a state transition has occurred and, if so, it causes an appropriate change in the associated transition state data stored in the memory.

16 Claims, 2 Drawing Sheets

US 7,391,821 B2

OPERATIONAL STATE TRANSITION AND EVENT LOGGING SYSTEM FOR AN RF TRANSMITTER

TECHNICAL FIELD

The present invention is directed to RF transmitters and, more particularly, to monitoring and recording operational state transitions and events thereof.

BACKGROUND OF THE INVENTION

RF transmitters include AM, FM and TV transmitters. Such transmitters typically include a group of RF amplifiers and power supplies with a plurality of components. Such a transmitter has different operational modes. Some systems have a very sophisticated turn-on and turn-off process or sequence. The sequence may include a dozen or more steps or stages and the operation will be switched from one state to another during the process. The timing between the various states of operation may be very critical; otherwise it may cause damage to the system. A typical IOT (Inductive Output Tube) transmitter, for example, may include a plurality of states such as four main states and each main state may have several sub-states such as fourteen sub-states. These sub-states operate the on, off or standby processes as the system advances from one state to another in precise timing. The processes may be interrupted by an external event such as a command or one of many possible faults.

It is desirable that all state transition and mode switching be recorded along with the time of happening for system operation diagnosing and monitoring. All commands or faulty events that happen during the operation to cause system state change should be recorded with the time of occurrence. The recording (or logging) could record operator activities on the system operation, such as issuing a command to turn on or off the system or the subsystem or to raise or lower the power or to switch exciters.

SUMMARY OF THE INVENTION

The present invention provides for monitoring and recording operational state transitions and events of an RF transmitter having a plurality of operational states. The apparatus includes a plurality of ports that each receive an indication of an occurrence of an event that can cause a transition from one state to another. A transition status memory stores transmission status data representing the status of each associated state. A microcontroller is programmed to respond and it determines, for each state, as to whether a state transition has occurred and, if so, it causes an appropriate change in the associated transition state data stored in the memory.

In accordance with another aspect of the present invention, the events that may cause a transition may be external events or internal events. Such external events may be due to commands from front panel button pressing or from a remote serial communications bus or from another controller. Also, the events may be the result of critical faults that could change the system operational state.

Still further in accordance with another aspect of the invention, the indications of an occurrence of an event may represent internal or external events.

Still further in accordance with another aspect of the invention, the stored status data includes data representing the current and previous status of each associated state.

Still further in accordance with the present invention, the plurality of states may include main states as well as sub-states wherein each main state has a plurality of sub-states, for example.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF A PREFERRED EMBODIMENT

Reference is now made to the drawings and the showings are for purposes of illustrating a preferred embodiment of the invention only and not for purposes of limiting same.

Figure 1:
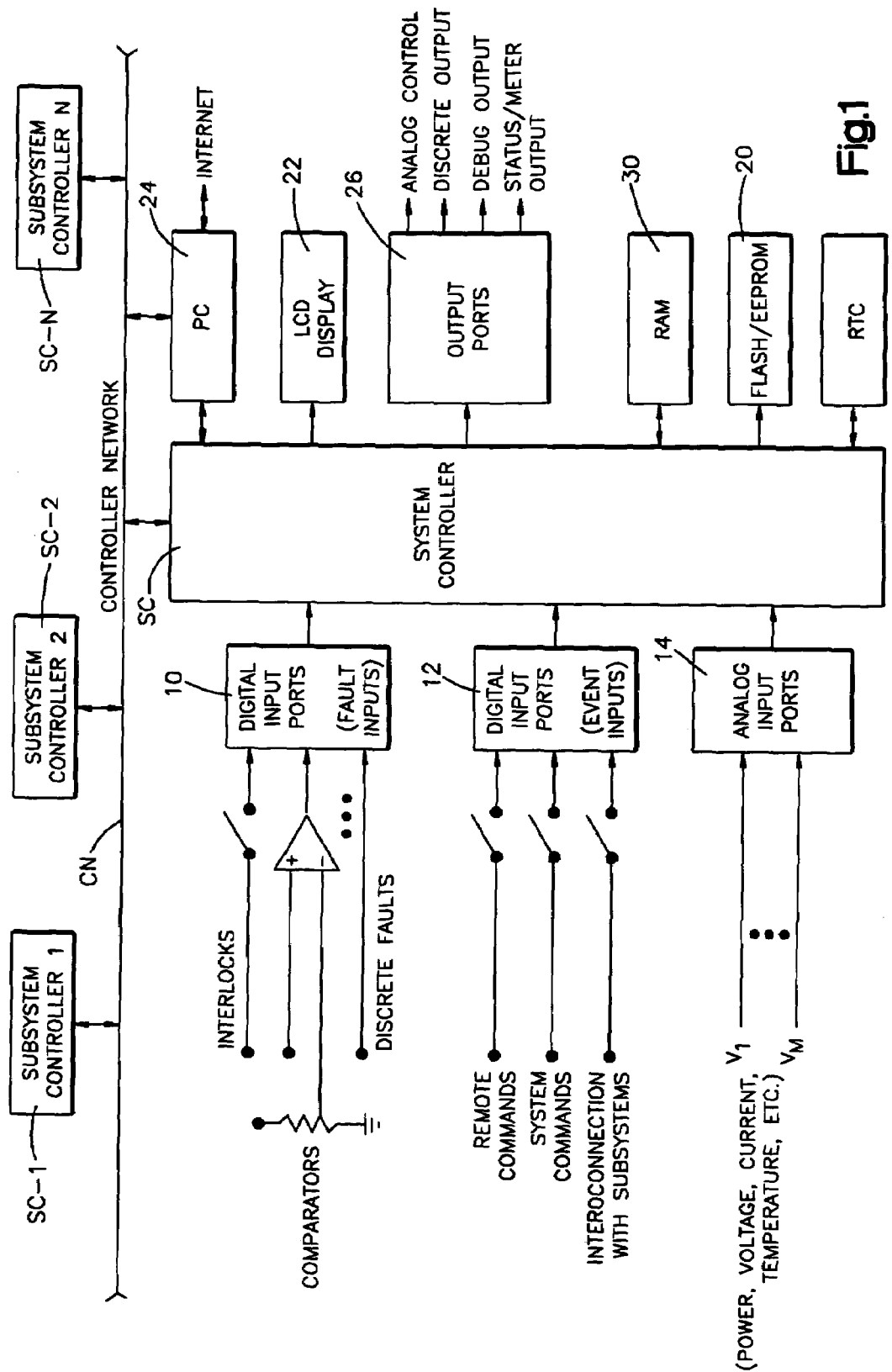
FIG. 1 is a schematic-block diagram illustration of one embodiment of the invention.

As illustrated in FIG. 1, there is provided a plurality of ports including digital input ports 10 for receiving fault inputs, digital ports 12 for receiving other external event inputs and analog input ports 14 for receiving other external event inputs. The inputs for the digital input ports 10 may be received from monitored events by way of interlocks or by way of comparators or they may take the form of discreet faults. Also, the event inputs to the digital input ports 12 may be received from remote commands or system commands or from interconnections with subsystems. The inputs to the analog input ports 14 may be received as, for example, voltages $V_1$-$V_m$ which may be representative of power, voltage, current, temperature and the like. These signals are indications from various comparators, interlocks, command, etc. and may provide indications of the occurrence of an event that can cause a transition from one state to another within a plurality of states of operation of the transmitter. The digital input ports 10 and 12 and the analog input ports 14 all provide corresponding digital data to the system controller SC which may include a suitably programmed micro-computer. The system controller is connected by a suitable control network with other subsystem controllers such as subsystem controllers SC-1, SC-2 through SC-N. This is all connected by means of a control network CN.

The system controller SC is provided with a memory 20 that may take a form of a flash memory or an EEPROM which may serve as the operation-event-state log. A real time clock RTC is provided and is used for recording the time of occurrence of the various events being recorded.

A log is a record of the faults and may be displayed as with an LCD display 22. Access may be with a PC 24. Suitable output ports 26 provide various outputs including those for analog control or a debug output or a status/meter output and the like. Additional memory may be stored by a suitable RAM memory 30. The data in the log may be displayed and may also be provided to an output printer, if desired. The data stored may appear in a printout or a video display in a manner so as to present data such as that illustrated in Table I presented below:

TABLE I

OPERATION/EVENT/STATE LOG

| INDEX | EVENT | MAIN STATE | SUB-STATE | TIME | |
|---|---|---|---|---|---|
| 1 | AC_RESTART | STANDBY | AC/Intlk VRF | 17:44:07 | Mar. 15, 2005 |
| 2 | NO | STANDBY | Cooling on CMD | 17:44:07 | Mar. 15, 2005 |
| 3 | NO | STANDBY | Cooling Verify | 17:44:18 | Mar. 15, 2005 |
| 4 | NO | STANDBY | HVPS on CMD | 17:44:18 | Mar. 15, 2005 |
| 5 | NO | STANDBY | HVPS on Verify | 17:44:32 | Mar. 15, 2005 |
| 6 | NO | STANDBY | Fila. Rdy Verify | 17:44:47 | Mar. 15, 2005 |
| 7 | NO | STANDBY | Filament Ready | 17:46:24 | Mar. 15, 2005 |
| 8 | VT100_CMD | BEAM ON | System Verify | 17:47:57 | Mar. 15, 2005 |
| 9 | FPS_I_FAULT | BEAM OFF | HPA Off | 17:47:57 | Mar. 15, 2005 |
| 10 | FP_CMD | BEAM ON | AC/Intlk VRF | 17:47:57 | Mar. 15, 2005 |
| 11 | NO | BEAM ON | Cooling on CMD | 17:48:08 | Mar. 15, 2005 |
| 12 | NO | BEAM ON | Cooling Verify | 17:48:08 | Mar. 15, 2005 |
| 13 | NO | BEAM ON | HVPS on CMD | 17:48:08 | Mar. 15, 2005 |
| 14 | VT100_CMD | BEAM ON | HVPS on CMD | 17:48:08 | Mar. 15, 2005 |
| 15 | NO | BEAM ON | HVPS on Verify | 17:48:08 | Mar. 15, 2005 |
| 16 | NO | BEAM ON | Fila. Rdy Verify | 17:48:23 | Mar. 15, 2005 |
| 17 | NO | BEAM ON | System Verify | 17:49:17 | Mar. 15, 2005 |
| 18 | NO | BEAM ON | Stepstart on CMD | 17:49:17 | Mar. 15, 2005 |

The information presented in Table I is for illustration purposes only and may be helpful in understanding the description of the invention as presented hereinbelow.

The operation of the system is designed and organized as a state-machine, also called Finite State Machine (FSM). The main operation modes, such as turning-on, turning-off and any mode switching transition, are defined as individual main states. Each step or stage between the transitions of the main states or the operational modes is defined as sub-state, refer to Appendix A. Thus at any given time for any given operational condition, the system is operated in one of the predetermined main states and one of the sub-states. Any transition between any two main states or any sub-states of a main state will be recorded with the time in the log, refer to Appendix A and B. The state, the event, fault and commands are predefined as follows:

1. State Definition
   1. The system main operation modes are defined as main state.
   2. The steps for each operational process, such as steps during turning-on process, are defined as sub-states.

Both main state and sub-state are defined by a unique numerical identifier, which is used as an index number ranged from 0 to a pre-defined value. And there is a one to one correspondent relationship between the state and the index number.

2. Event Definition

All events, such as commands from front panel button pressing, or commands from a remote serial communication bus or a command from another controller are defined as a unique numerical identifier, which are used as an index number, refer to the Appendix C.

3. Fault Definition

All critical faults, which could change the system operational state, are organized as a group of unique events as well. And every fault has a unique identifier numerically represented by an index number, refer to the Appendix D.

4. Log Definition

Since at any given time at any given condition, the system's operational state will be uniquely defined and predetermined by system designer using these numerical identifiers to present the main states, sub-states, events and faults to organize a logging system, the system operator or user can determine the system's operation condition and system performance for any given time. The logging system uses this information to organize the format for each logging entry; each entry is a record in the log and it has the correspondent fields of the main state, sub-state, event and time of the transition. Each record is indexed by the sequential order as it happens with the elapse time.

5. Logging Method

The logging system includes three main modules and they are:
1. Transition recording module—The module is part of the state machine software; it monitors and records the system state transition into the logging system all the time.
2. Event processing module—The module is part of control software and it will record any event that happened in the system and caused the state transition.
3. Fault Processing Module—Any critical fault; which causes the system state transition; it will be recorded in the log along with the state-transition and the time.

6. The log Storage and Access

The log is embedded into the system or any sub-system, which requires such a log system for system maintenance or diagnostics. The log could be stored either in RAM (Random Access Memory) or EPROM (Erasable Programmable Read-Only Memory), such as flash memory. The log could be viewed or monitored via some kind of serial links, such as RS232, RS484, Ethernet or CAN. In the design the log is viewed by connecting the controller serial port to a serial port of a PC by using Hyper-Terminal. The log could be uploaded to any PC via a serial link for remote monitoring.

The method has the following advantages.
1. The state transition and event log will automatically record any operational state change in the system or transmitter, such as internal state transition procedure, any external events, such as operator's operation, and any critical faults, which cause the transmitter state changing.

2. The system could be used for system diagnosis, fault event monitoring, and operator's operation monitoring. In all these cases, the logging reveals the transmitter internal state transition happened internally; this will help to reduce the developing time and cost and improve the quality, and help the user or operator of the transmitter to monitor and diagnose the transmitter's operation.

Reference is made to Table I. Note as follows:

1. In transition index number 8, VT_100_CMD in EVENT column shows the event that made the state-transition from STANDBY to BEAM ON is from VT100 Hyper Terminal.
2. In transition index number 9, FPS_I_FAULT in EVENT column shows the event that made the state-transition from BEAM On to BEAM OFF is Focus Power Supply Current Fault.
3. In transition index number 10, FP_CMD in EVENT column shows that a Beam ON command from front panel is received.
4. In transition index number 2, 3 and so on, NO in EVENT column shows there is no external event happening and the system is switching the state by internal state-machine.
5. The time and date in column TIME shows the time and date when state transition happened.

The above discussion relative to the log illustrated in Table I is just an example of the type of data that is stored in the log and which can be displayed or presented as a printout, for example. It should be noted that the log illustrates transition status data representing both the current as well as the previous status of each state. The manner in which a computer functions and the various states and events including external events and critical faults is presented in the appendices that are presented below in Appendix A, Appendix B, Appendix C and in Appendix D.

Appendix A: State Machine Design

1. State Function $$S(X_K, Y_K) = f((X_{K-1}, Y_{K-1}, X_{K-2}, Y_{K-2}), (E_{1K-1}, \ldots E_{MK-1}), (F_{1K-1}, \ldots F_{NK-1}));$$

2. State Machine Response Action Function (Output Function)

$$R(X_K, Y_K) = g((X_{K-1}, Y_{K-1}, X_{K-2}, Y_{K-2}), (E_{1K-1}, \ldots E_{MK-1}) (F_{1K-1}, \ldots F_{NK-1}));$$

3. State Machine Function $$[S|R]^T = G[(X_{K-1}, Y_{K-1}, X_{K-2}, Y_{K-2}), (E_{1K-1}, \ldots E_{MK-1}), (F_{1K-1}, \ldots F_{NK-1})];$$

Notes:
S: Function of the state machine
R: Function of the response to the states, events and fault variation.
G: State Transition Matrix, which describes the relationship among the states, event and output.
X: Main state
$X_K$: The next main state (or the main state at time period K)
$X_{K-1}$: The current main state (or the main state at time period K-1)
$X_{K-2}$: The previous main state (or the main state at time period K-2)
Y: Sub-state
$Y_K$: The next sub-state (or the sub-state at time period K)
$Y_{K-1}$: The current sub-state (or the sub-state at time period K-1)
$Y_{K-2}$: The previous sub-state (or the sub-state at time period K-2)
E: External Event including commands from front panel, remote port and serial port
$E_{1K-1}$: Event indexed 1 at time period K-1
$E_{MK-1}$: Event indexed M at time period K-1
F: Faults in the system
$F_{1K-1}$: Fault indexed 1 at time period K-1
$F_{NK-1}$: Fault indexed N at time period K-1

Appendix B: Designed Transmitter System States

1. System States (main states)
   1. HPA_OFF
   2. HPA_BEAM_ON
   3. HPA_STANDBY_ON
   4. HPA_BG_HEAT_ON
2. The all Sub-State of Off Process (transition from other state to HPA_OFF state)
   1. OFF_RF_MUTE_COMMAND
   2. OFF_RF_MUTE_VERIFY
   3. OFF_BEAM_SUPPLY_OFF_COMMAND
   4. OFF_BEAM_SUPPLY_OFF_VERIFY
   5. OFF_HVPS_OFF_COMMAND
   6. OFF_HVPS_OFF_VERIFY,
   7. OFF_BEAM_OFF
3. The all Sub-State of HPA Beam ON Process (transition from other states to HPA_BEAM_ON state)
   1. BEAM_AC_VERIFY
   2. BEAM_COOLING_ON_COMMAND
   3. BEAM_COOLING_STATUS_VERIFY
   4. BEAM_HVPS_ON_COMMAND
   5. BEAM_HVPS_STATUS_VERIFY
   6. BEAM_FILAMENT_READY_VERIFY
   7. BEAM_SYSTEM_VERIFY
   8. BEAM_SUPPLY_ON_COMMAND
   9. BEAM_SUPPLY_STATUS_VERIFY
   10. BEAM_QUIESCENT_STATUS_VERIFY
   11. BEAM_RF_UNMUTE_COMMAND
   12. BEAM_ALC_RAMP_UP_COMMAND
   13. BEAM_XMTR_ON_AIR
   14. BEAM_RF_MUTE_STATE
4. The all Sub-State of HPA Standby ON Process (transition from other state to HPA_STANDBY_ON state)
   1. STANDBY_AC_VERIFY
   2. STANDBY_COOLING_ON_COMMAND
   3. STANDBY_COOLING_STATUS_VERIFY
   4. STANDBY_HVPS_ON_COMMAND
   5. STANDBY_HVPS_STATUS_VERIFY
   6. STANDBY_FILAMENT_READY_VERIFY
   7. STANDBY_FILAMENT_READY
   8. STANDBY_BEAM_SUPPLY_OFF_VERIFY
   9. STANDBY_BEAM_SUPPLY_OFF_COMMAND
   10. STANDBY_RF_MUTE_VERIFY
   11. STANDBY_RF_MUTE_COMMAND
5. The all Sub-State of HPA BG Heat ON Process (transition from other state to HPA_BG_HEAT_ON state)
   1. BG_HEAT_AC_VERIFY
   2. BG_HEAT_COOLING_ON_COMMAND
   3. BG_HEAT_COOLING_STATUS_VERIFY
   4. BG_HEAT HVPS_ON_COMMAND
   5. BG_HEAT_HVPS_STATUS_VERIFY
   6. BG_HEAT_FILAMENT_READY_VERIFY
   7. BG_HEAT_FILAMENT_READY
   8. BG_HEAT_FULL_FILA_OFF_COMMAND
   9. BG_HEAT_BEAM_SUPPLY_OFF_VERIFY 10. BG_HEAT_BEAM_SUPPLY_OFF_COMMAND
11. BG_HEAT_RF_MUTE_VERIFY
12. BG_HEAT_RF_MUTE_COMMAND Appendix C: External Events
1. NO_CHANGE
2. AC_RESTART
3. THREE_STRIKE (Fault Three Recovery)
4. SYS_CAN_CMD (System Control Area Network Command)
5. SYS_BUS_CMD (System Bus Command)
6. FNT_PNL_CMD (Front Panel push button Command)
7. VT100_CMD (HyperTerminal VT100 Command)
8. STDBY_TIME_LMT (Standby Time Limit)
9. FP_RS485_CMD (Front Panel RS485 Bus Command)
10. THREE_STRIKE_OUT (Fault Three Strike End)
11. SYS_BUS_MUTE (System Bus Mute Command)
12. SYS_BUS_UNMUTE (System Bus Un-Mute Command)
13. RFU_RF_MUTE (RF Unit RF Mute Command)
14. RFU_RF_UNMUTE (RF Unit RF Un-Mute Command)
15. REMOTE_CMD (Remote control Command)

Appendix D: Critical Faults (Which Will Cause System State Changing)
1. RFLD_PWR_OL (Reflected Power Overload)
2. FWD_PWR_OL (Forward Power Overload)
3. DRV_PWR_OL (Driver Power Overload)
4. PRI_CAV_ARC (Primary Cavity Arc fault)
5. SEC_CAV_ARC (Primary Cavity Arc fault)
6. BS_AC_FAULT (Beam Supply AC Fault)
7. CAB_AC_FAULT (Cabinet AC Fault)
8. AC480_FAULT (AC480 V Fault)
9. AC110_FAULT (AC110 V Fault)
10. S_START_FAULT (Step-Start Fault)
11. CROWBAR_FAULT_OFF (Crowbar Off Fault)
12. COOL_FAULT_OFF (Cooling Off Fault)
13. HVPS_FAULT_OFF (High Voltage Power Supply Off Fault)
14. ARC_DET_FAULT (Arc Detector Fault)
15. SYS_FAULT_OFF (System Bus Fault Off)
16. COL_N_OV_FAULT (Collector N[1 to 5] Over Voltage Fault)
17. COL_N_UV_FAULT (Collector N[1 to 5] Under Voltage Fault)
18. COL_N_I_FAULT (Collector N[1 to 5] Current Fault)
19. FPS_V_FAULT (Focus Power Supply Voltage Fault)
20. FPS_I_FAULT (Focus Power Supply Current Fault)
21. RTN_I_FAULT (Step-Start Fault)
22. GND_I_FAULT (Grounding Current Fault)
23. CTHD_I_FAULT (Cathode Current Fault)
24. DRV_PWR_LOSS (Drive Power Fault)
25. RF_MUTE_FAIL (RF Mute Fail Fault)
26. SS_CABLE_INTLK (Step-Start Cable Interlock Fault)
27. GNDG_SW_INTLK (Grounding Switch Interlock Fault)
28. OIL_LEVEL_INTLK (Tank Oil Level Interlock Fault)
29. GNDG_STICK_INTLK Grounding Stick Interlock (Fault)
30. BS_DOOR_INTLK (Beam Supply Interlock Fault)
31. HPA_INTLK (High Power Amplifier Interlock Fault)
32. HANDLE_INTLK (Handle Interlock Fault)
33. TUBE_INTLK (Tube Interlock Fault)
34. CAV1_CABLE_INTLK (Cavity 1 Interlock Fault)
35. CAV2_CABLE_INTLK (Cavity 2 Interlock Fault)
36. PS_CAB_DR_INTLK (Power Supply Cabinet Door Interlock Fault)
37. FRNT_PANEL_INTLK (Front Panel Interlock Fault)
38. SYS_BUS_INTLK (System Bus Interlock Fault)
39. BS_PHS_IMB (Beam Supply Phase Imbalance Fault)
40. BS_PHS_SEQ (Beam Supply Phase Sequence Fault)
41. CAB_PHS_IMB (Cabinet Phase Imbalance Fault)
42. CAB_PHS_SEQ (Cabinet Phase Sequence Fault)
43. VCR_PS1_AC (Vicor Supply 1 AC Fault)
44. VCR_PS1_DC Vicor Supply 1 DC Fault)
45. VCR_PS2_AC (Vicor Supply 2 AC Fault)
46. VCR_PS2_DC Vicor Supply 2 DC Fault)
47. QUIESC_CURR (Quiescent Current Fault)

Figure 2:
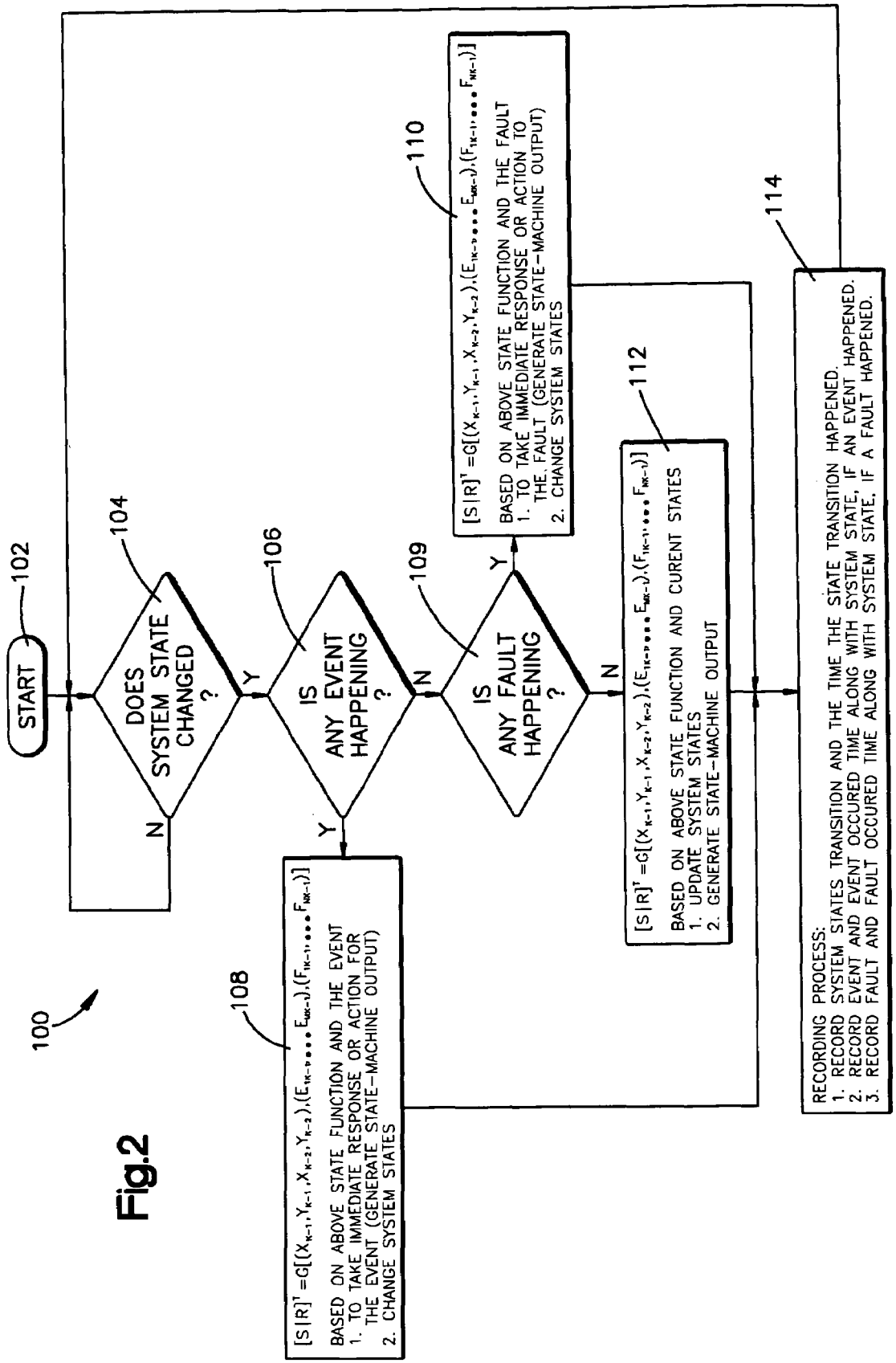
FIG. 2 is a flow diagram illustrating a routine involved in practicing the invention.

Attention is now specifically directed to FIG. 2 which illustrates a flow diagram for a state transition monitor procedure 100 and which is programmed in the system controller. This procedure commences with step 102 and advances to step 104 to determine whether or not a system state change has taken place. If not, it returns to have this determination made again. If a state change has taken place, the procedure advances to step 106 during which a determination is made as to whether any event is happening. If so, the procedure advances to step 108 during which the procedure solves the state function equation described in section 3 of Appendix A and based on the results thereof, it takes immediate response or action for the event (generates a state-machine output). Thereafter a change is made in the system state. If an event is not happening at step 106, the procedure advances to step 109 during which a determination is made as to whether a fault is happening. If this type of event is happening, the procedure advances to step 110 which is similar to that of step 108 described above.

If no fault is happening during the determination at step 109, the procedure advances to step 112. This step is similar to step 109 or 110 described above. After step 109 or step 110 or step 112 has taken place, the procedure will advance to step 114. This a recording process and during this step a recording takes place of the system state transition and the time that the transition happened. Also, the system records the event and the time along with the system state, if an event happened. Also, any fault is recorded along with the fault time. Thereafter, the procedure returns to the determination step 104.

Although the invention has been described with respect to a preferred embodiment, it is to be appreciated that various modifications may be made without departing from the spirit and scope of the invention as defined by the appended claims.

Having described the invention, I claim:

1. Apparatus for monitoring and recording operational state transitions and events of an RF transmitter having a finite plurality of operational states in a finite state machine, comprising:
    a plurality of input ports that each receive an indication of an occurrence of an event that can cause a transition from one state to another of said plurality of states;
    a transition status memory that stores transition status data representing the status of each associated state; and
    a micro-controller programmed so that it determines, for each state, from said indications whether a state transition has occurred as a result of a said event taking place that causes a said state transition and, if so, it causes an appropriate change in the associated transition state data stored in said memory.

2. Apparatus as set forth in claim 1 wherein a said event may be an external event or an internal event.

3. Apparatus as set forth in claim 1 wherein said indications may represent internal or external events.

4. Apparatus as set forth in claim 1 wherein said stored status data includes data representing the current and previous status of said associated state.

5. Apparatus as set forth in claim 4 wherein a said event may be an external event or an internal event.

6. Apparatus as set forth in claim 4 wherein said indications may represent internal or external events.

7. Apparatus as set forth in claim 4 wherein a said event may be an external event or an internal event and said indications may represent internal or external events.

8. Apparatus as set forth in claim 4 wherein said stored status data further includes an index number unique for each state and the time and date of a said state transition associated therewith.

9. Apparatus as set forth in claim 8 wherein a said event may be an external event or an internal event.

10. Apparatus as set forth in claim 8 wherein said indications may represent internal or external events.

11. Apparatus as set forth in claim 8 wherein a said event may be an external event or an internal event and wherein said indications may represent internal or external events.

12. Apparatus as set forth in claim 1 wherein a said event may be a fault that can cause a said transition.

13. Apparatus as set forth in claim 12 wherein a said event may be an external event or an internal event.

14. Apparatus as set forth in claim 12 wherein said indications may represent internal or external events.

15. Apparatus as set forth in claim 14 wherein said stored status data includes data representing the current and previous status of each said associated state.

16. Apparatus as set forth in claim 15 wherein said stored data further includes an index number unique for each state and the time and data of said state transition associated therewith.

* * * * *